United States Patent
Van Gerwen (10) Patent No.: US 11,412,746 B2
(45) Date of Patent: *Aug. 16, 2022

(54) FEED CHANNEL WITH A CUSTOMIZED EXIT

(71) Applicant: GEA Food Solutions Bakel B.V., EN Bakel (NL)

(72) Inventor: Hendrikus Petrus Gerardus Van Gerwen, Someren (NL)

(73) Assignee: GEA Food Solutions Bakel B.V., Bakel (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/710,633

(22) Filed: Dec. 11, 2019

(65) Prior Publication Data

US 2020/0113195 A1 Apr. 16, 2020

Related U.S. Application Data

(63) Continuation of application No. 15/035,672, filed as application No. PCT/EP2014/075502 on Nov. 25, 2014, now Pat. No. 10,537,114.

(30) Foreign Application Priority Data

Dec. 4, 2013 (EP) ..................................... 13195750

(51) Int. Cl.
*A22C 7/00* (2006.01)
*A23P 30/10* (2016.01)

(52) U.S. Cl.
CPC .......... *A22C 7/0076* (2013.01); *A22C 7/0069* (2013.01); *A22C 7/0084* (2013.01); *A23P 30/10* (2016.08)

(58) Field of Classification Search
CPC ... A22C 7/0084; A22C 7/0069; A22C 7/0076; A23P 30/10
See application file for complete search history.

(56) References Cited

U.S. PATENT DOCUMENTS 3,887,964 A * 6/1975 Richards .............. A22C 7/0076
425/562
4,097,961 A 7/1978 Richards
(Continued)

FOREIGN PATENT DOCUMENTS

CN 85203291 U 7/1986
CN 1189297 A 8/1998
(Continued)

OTHER PUBLICATIONS

International Search Report and Written Opinion for Application No. PCT/EP2014/075502, dated Feb. 9, 2015.
(Continued)

*Primary Examiner* — Seyed Masoud Malekzadeh
(74) *Attorney, Agent, or Firm* — The Dobrusin Law Firm, P.C.

(57) ABSTRACT

A system for forming a food product, the system includes a mould drum that includes a multitude of cavities; a feed channel that feeds the food mass into the cavities; a seal plate located downstream of the feed channel, which seals the cavities against leakage during and/or after filling; a valve provided in the seal plate, the valve includes a piston that reciprocates between a retracted position and an extended position to open and close a connection between the feed channel and the cavities in the mould member. The feed channel is tapered or includes an insert that is tapered in a direction opposite a flow direction of the food mass through the feed channel. The feed channel includes a sloped wall that tapers in a direction opposite a flow direction of the
(Continued)

food mass, and the feed channel has a straight wall downstream of the sloped wall.

18 Claims, 8 Drawing Sheets

(56) References Cited

U.S. PATENT DOCUMENTS

| | | | |
|---|---|---|---|
| RE30,096 E * | 9/1979 | Richards | A22C 7/0084 |
| | | | 425/572 |
| 4,343,068 A | 8/1982 | Holly | |
| 4,356,595 A | 11/1982 | Sandberg et al. | |
| 4,541,143 A | 9/1985 | Holly | |
| 4,957,425 A * | 9/1990 | Fay | B30B 11/12 |
| | | | 425/362 |
| 5,021,025 A | 6/1991 | Wagner | |
| 5,618,571 A * | 4/1997 | London | A21C 11/18 |
| | | | 426/512 |
| 5,655,436 A * | 8/1997 | Soper | A22C 7/0084 |
| | | | 99/426 |
| 5,730,650 A | 3/1998 | Soper | |
| 5,866,176 A * | 2/1999 | Baars | A22C 7/0084 |
| | | | 249/141 |
| 6,398,540 B1 | 6/2002 | Burroughs et al. | |
| 6,416,314 B1 | 7/2002 | LaBruno | |
| 6,572,360 B1 | 6/2003 | Buhlke et al. | |
| 6,592,259 B2 | 7/2003 | Kennedy et al. | |
| 6,592,359 B2 | 7/2003 | Kennedy et al. | |
| 7,416,753 B2 * | 8/2008 | Lindee | A22C 7/0038 |
| | | | 425/572 |
| 7,976,303 B2 | 7/2011 | Van der Eerden et al. | |
| 7,993,126 B2 * | 8/2011 | Sandberg | A22C 7/0084 |
| | | | 425/185 |
| 8,469,697 B2 * | 6/2013 | Lindee | B29C 37/0003 |
| | | | 425/572 |
| 9,044,029 B2 | 6/2015 | Van Der Eerden et al. | |
| 9,526,269 B2 | 12/2016 | Van Doorn et al. | |
| 9,788,554 B2 * | 10/2017 | Van Zoelen | A22C 7/00 |
| 9,949,493 B2 | 4/2018 | Van Gerwen | |
| 2002/0115402 A1 * | 8/2002 | Sandberg | A22C 7/0084 |
| | | | 452/174 |
| 2002/0192328 A1 | 12/2002 | Kennedy et al. | |
| 2005/0013895 A1 | 1/2005 | Azzar | |
| 2005/0072312 A1 * | 4/2005 | Pasek | A22C 7/003 |
| | | | 425/192 R |
| 2005/0072634 A1 * | 4/2005 | Pasek | A23P 30/10 |
| | | | 184/5 |
| 2005/0074515 A1 | 4/2005 | Hansen et al. | |
| 2007/0163268 A1 | 9/2007 | Mansuino | |
| 2008/0233228 A1 * | 9/2008 | Lindee | A22C 7/0084 |
| | | | 425/144 |
| 2008/0233230 A1 * | 9/2008 | Sandberg | A22C 7/0084 |
| | | | 264/328.8 |
| 2008/0260885 A1 * | 10/2008 | LaBruno | A23P 30/10 |
| | | | 425/261 |
| 2012/0015065 A1 | 1/2012 | Van Der Eerden et al. | |
| 2012/0058213 A1 * | 3/2012 | Lindee | B30B 11/12 |
| | | | 425/135 |
| 2012/0177786 A1 | 7/2012 | Van der Eerden et al. | |
| 2014/0141135 A1 | 5/2014 | Van Doorn et al. | |
| 2014/0199423 A1 | 7/2014 | Righolt et al. | |
| 2015/0208674 A1 * | 7/2015 | Van Zoelen | A22C 7/0069 |
| | | | 425/441 |

FOREIGN PATENT DOCUMENTS

| | | |
|---|---|---|
| CN | 102421298 A | 4/2004 |
| EP | 1406497 B1 | 2/2008 |
| EP | 2449893 A1 | 5/2012 |
| JP | S6156893 A1 | 3/1986 |
| JP | 2004-529655 A | 9/2004 |
| RU | 2352131 C2 | 4/2009 |
| WO | 02102166 A1 | 12/2002 |
| WO | 03/099022 A1 | 12/2003 |
| WO | 2012/012581 A1 | 1/2012 |
| WO | 2012161577 A1 | 11/2012 |
| WO | 2013014010 A1 | 1/2013 |

OTHER PUBLICATIONS

Japanese Office Action for Japanese Patent Application No. 2016-535035; dated Aug. 29, 2018.
International Preliminary Report on Patentability dated Jun. 7, 2016 for Application PCT7EP2014/075502.
Chinese Office Action for Chinese patent application No. 201480072022.7; dated Jun. 28, 2017.
Third Party Observation for Application No. WO2014EP75502, dated Jun. 7, 2016.
Non-final Office Action for U.S. Appl. No. 16/710,560; dated Mar. 18, 2021.

* cited by examiner

FEED CHANNEL WITH A CUSTOMIZED EXIT

PRIORITY

This application is a continuation of U.S. Ser. No. 15/035,672 filed on May 10, 2016, now U.S. Pat. No. 10,537,114, which is a US National Stage Entry of PCT/EP2014/075502 filed Nov. 25, 2014, which claims priority to EP 13195750.8 filed Dec. 4, 2013.

FIELD

This invention relates to a system for forming a product from a food mass, comprising a mould member with a multitude of cavities, in which the food product is formed into for example patties and a feed channel which feeds the food mass into the cavities, wherein this feed channel has a width. The present invention further relates to a method to form a food mass into patties in the mould cavities of a mould member, wherein the food mass is fed to the mould cavities via a feed channel.

BACKGROUND

It may be desirable to have a system for forming a product from a food mass by providing a mould member with a multitude of cavities; a feed channel which feeds the food mass into the cavities; and a means to alter the width of the feed channel, depending on the food mass and/or shape of the food product to be formed.

SUMMARY

This system is well known from the state of the art and can be utilized to fill cavities in a mould member, which mould member will be used to form food articles, for example out of meat, fish, potatoes or vegetables. This mould member can be a plate, which reciprocates linearly between two positions, or a rotating drum. The mould member comprises a multitude of mould cavities which cavities can be arranged in rows which can extend perpendicular to the direction of motion of the mould member, particularly parallel to the axis of rotation of the drum. In case the mould member is a drum, it consists in a preferred embodiment out of a stainless steel tube shaped element. To this tube shaped element ribs can be applied which ribs provide rows in longitudinal direction of the drum. Elements of porous material, for example made from sintered stainless steel, can be positioned between the ribs. Every row should be provided with fluid passages which extend in longitudinal direction of the drum and which are located between the outer diameter of the tube shape element and the porous structure. During the filling of cavities, air entrapped in the cavities can escape via the walls of the cavities and the surrounding porous structure and via the passages out of the drum. During the discharge of formed products fluid will flow via a pressure source through the passage and through the porous structure to the cavities. This flow of fluid will eliminate the adhesion forces between the formed product and the cavity walls with result that the formed product will be discharged on for example a belt. To prevent that during discharge of formed products out of the cavities the fluid will flow to adjacent rows, reference can be made to WO 2012107236 wherein drum designs and fluid flow through a mould drum are described.

Reference can also be made to WO 2013107815 wherein a mass supply system and a process are described which can be used together with a mould member. In one of the embodiments in this patent application the use and design of a positive displacement feed pump is described and also a pressure control system to equalize the pressure over the width of the pump, divider and drum to achieve the same product weight of all formed products in longitudinal direction of the drum.

A pressure equalization system is described in order to reduce pressure peaks between food mass supply system and mould member. As soon as a pressure drop in the feed channel will occur as a result of filling a cavity, the pressure equalization system will deliver mass to the cavities in the mould member due to the stored volume of pressurized mass.

This application describes further a pressure controlled filling of cavities in a mould member and also a volume controlled filling. The control unit can for example be provided with intelligence to adjust the filling of a next row of cavities if a previous row is not entirely filled.

It is the objective of the present invention to improve the quality of the formed products.

This objective is achieved with a system for forming a product from a food mass, comprising a mould member with a multitude of cavities, in which the food product is formed into a food product, for example patties and a feed channel which feeds the food mass into the cavities, wherein this feed channel has a width, wherein the system comprises means to alter the width of the feed channel, particularly its exit, depending on the food mass and/or shape of the food product to be formed.

The disclosure made for this embodiment of the present invention also applies to and can be connected with the other embodiments of the present invention and vice versa.

The width of the feed channel, particularly the width of the exit of the feed channel is its extension in the direction of motion of the mould member.

The present invention is based to a system with a feed pump, preferably but not limited to a positive displacement pump, and a mould member, preferably a rotating mould drum, comprising cavities. The feed pump is preferably a positive displacement pump with a rotor. The feed pump pumps the food mass from a hopper into the cavities of the mould member in which the food mass is formed into the resulting food product, for example the patty.

The system can be utilized for processing meat, fish, potatoes and vegetables like spinach.

The mould member, preferably the mould drum, comprises mould cavities to form the products, which preferably are at least partially made from a porous material, for example made from a sintered metal material. Each porous cavity is connected to a fluid passage, which more preferably extends in the longitudinal direction of the drum. During rotation of the drum from the discharge position to the fill position the cavities can preferably be filled with air. During filling of product in the product cavities, this air within the cavities will preferably be discharged through the porous walls of the at least partially porous cavities.

Additionally or alternatively, gas in the product, for example air, can be removed from the product through the porous material and via the fluid passage, for example to the ambient.

It has now been found that the quality of the resulting food product, particularly its weight and its shape before and/or after cooking is dependent on the width and/or the shape of the feed channel, particularly the exit of the feed channel. It is advantageous to feed and/or exit food mass with comparatively many fibers through a feed channel with a relatively small exit area, while products with relatively little or no fibers can be fed and/or exited through a feed channel with a relatively wide feed channel.

Each feed channel can be customized for the individual application.

Preferably, the means is an insert which is provided in the feed channel, preferably at the exit of the feed channel. This insert is more preferably exchangeable, so that the feed channel and thus the system can be adapted to the individual application.

Preferably, the surface of the insert is curved and/or tapered, to minimize its flow resistance.

Preferably, the width of the channel reduces with the direction of flow of the food mass.

Preferably, the means extend over the entire length of the feed channel. However the means need not have a constant width, measured in the direction of movement of the mould member, over the length of the feed channel. For example, the width of the means can be smaller in the vicinity of cavity in comparison to the width of the means between two cavities.

Another preferred or inventive subject matter of the present invention is a system having a mould member which comprises a multitude of cavities in one row which are filled simultaneously via a feed channel. According to this embodiment of the present invention, the feed channel, a seal plate, and/or a manifold comprises one individual exit per cavity in one row.

The disclosure made for this embodiment of the present invention also applies to and can be connected with the other embodiments of the present invention and vice versa.

According to this embodiment of the present invention, each cavity in one row has its own exit. Between these exits, the outlet are of the feed channel is preferably closed, so that no food mass can exit there. Due to this embodiment, the width of the exit of the feed channel is also reduced, at least locally. The individual exits can be in the feed channel, in a manifold which is located downstream from the feed channel and/or in a seal plate, which seals the cavities of the mould member against leakage during and/or after their filling.

Preferably, the exits channels are part of the insert.

Preferably, the exit channels are part of the seal plate and/or the manifold.

Preferably, the shape of the exit of the feed channel is at least similar to the shape of the food product. In case round patties shall be produced, the shape of cross-section of the exit is preferably round as well. In case oval patties shall be produced, the shape of cross-section of the exit is preferably oval as well. More preferably, the exit is smaller than the cross section of the mould cavity parallel to the exit during filling of the mould cavities.

Another subject matter of the present invention is a method to form a food mass into a food product, for example patties in the mould cavities of a mould member, wherein the food mass is fed to the mould cavities via a feed channel, which has a width, wherein the width is altered depending on the food mass to be formed.

The disclosure made for this embodiment of the present invention also applies to and can be connected with the other embodiments of the present invention and vice versa.

Preferably, the width of the feed channel is decreased with increasing fiber contents of the food mass.

Another preferred or inventive subject matter of the present invention is a method wherein the food mass enters each cavity in a central area and flows from there towards the sidewall of the cavity.

The disclosure made for this embodiment of the present invention also applies to and can be connected with the other embodiments of the present invention and vice versa.

Another preferred or inventive subject matter of the present invention is a method wherein the exit of the feed channel, a seal plate and/or a manifold pre-forms the food mass individually for each mould cavity in one row.

The disclosure made for this embodiment of the present invention also applies to and can be connected with the other embodiments of the present invention and vice versa.

Preferably, food mass is formed into individual strands of food mass, more preferably, one strand per mould cavity.

Preferably, the speed of the flow of the food mass is increased towards the exit of the feed channel. Hence, the mass will enter the empty cavity with more momentum which will result in an improved fiber orientation.

This inventive method assures an even filling of each cavity and an orientation of the fibers of the food mass from the center towards the rim of the product, so that the food product does not change its shape during cooking.

The inventions are now explained according to the Figures. These explanations do not limit the scope of protection. The explanations apply to all embodiments of the present invention likewise.

DETAILED DESCRIPTION

Figure 1:
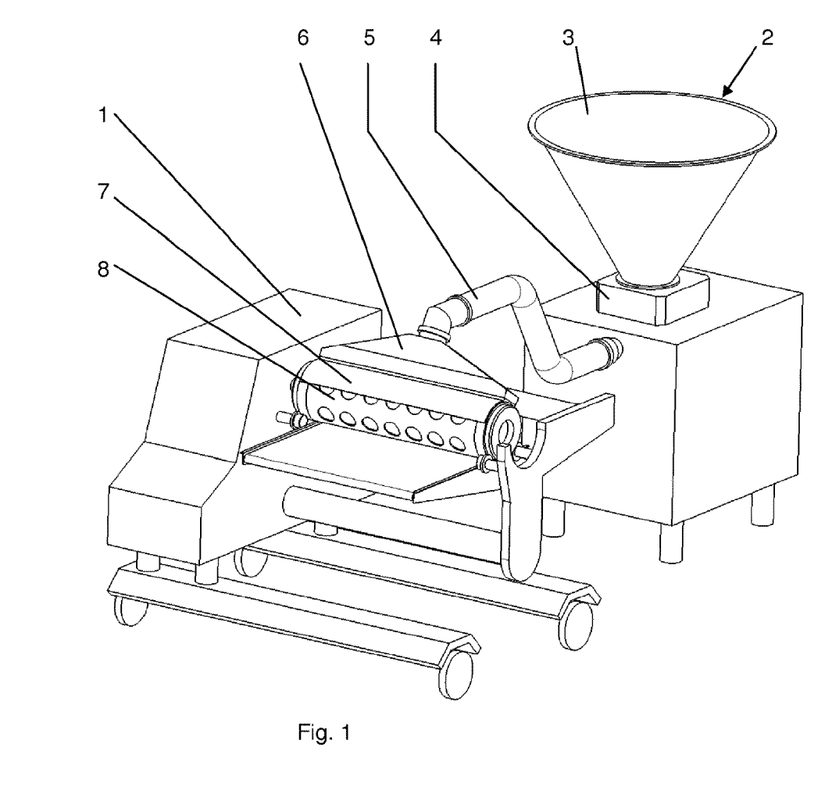
FIG. 1 shows the inventive food mass forming system.

FIG. 1 shows a mass supply system 2 comprising a pump system 4 and a hopper 3 and which is connected via mass transfer means 5 and divider 6 to a forming apparatus 1. The forming apparatus is here provided with a mould drum 8. Seal 7 will be used to reduce/prevent leakage of food mass to the ambient. The mould drum rotates around an axis and is filled in a filling position with a food mass which is pressed into the cavities 9. In a discharge position, the formed products are discharged, here on a transportation belt. The person skilled in the art understands that the mould member can also be a reciprocating mould plate.

Figure 2:
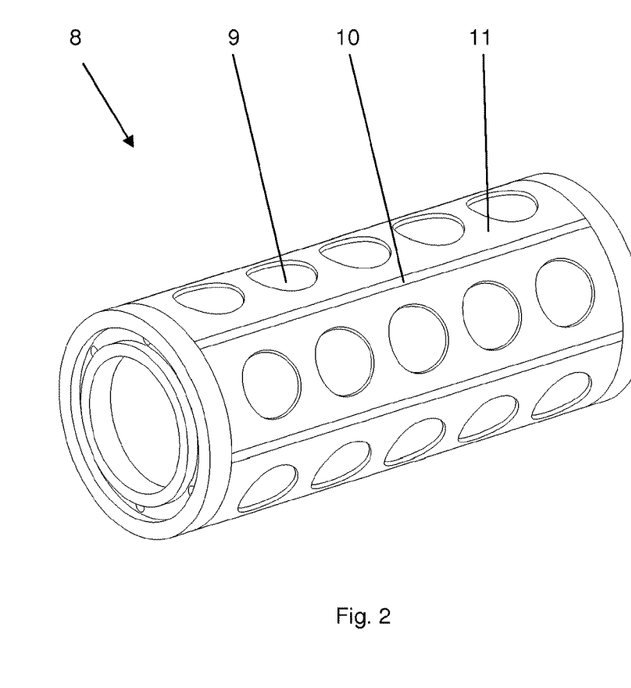
FIG. 2 shows a rotating drum as the mould member.

In case the mould member is a rotating drum, it can be designed as shown in FIG. 2. In this embodiment a porous structure 11 is applied between ribs 10 and mould cavities 9 are provided within the porous structure. This porous structure can be vented during filling of the cavities and can be utilized to discharge the formed products out of the mould cavities with compressed gas. The drum has six rows of cavities, each row having five cavities 9, which ate normally filled in parallel and all cavities in one row are controlled according to the same control-scheme.

Figure 3:
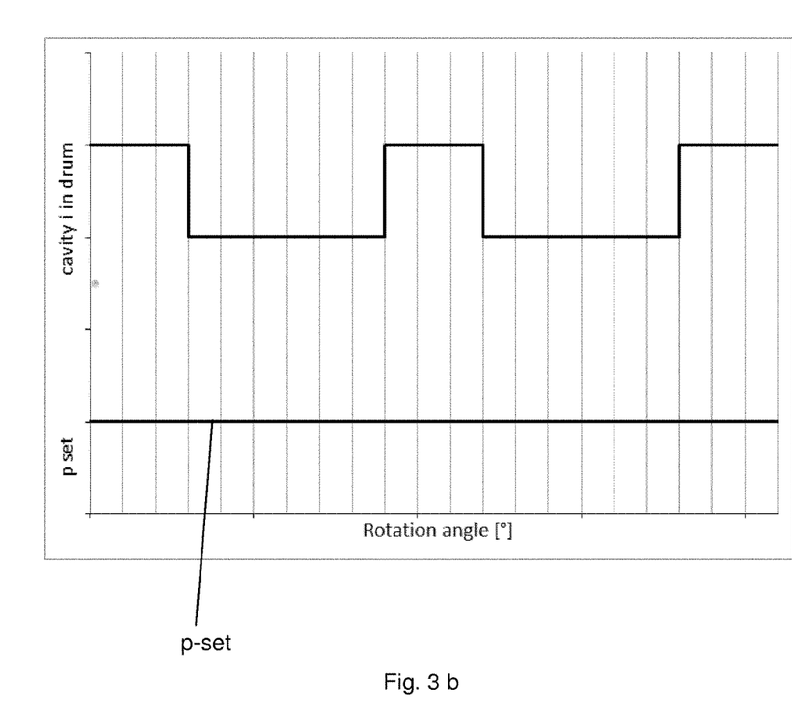
FIGS. 3a and 3b shows the inventive system and a potential control scheme of the inventive food mass forming system.

FIG. 3a shows a pressure controlled system. Therefore pressure measuring means 17, for example a sensor, are positioned in the feed channel to measure the actual pressure p-fc of the mass.

FIG. 3b shows a graph with desired pressure profile p-set versus the rotation angle (rotational displacement) of the mould member, here a drum. The control system in this embodiment is well known in the field to fill food stuff material in cavities in as well a drum type mould member as a plate type mould member. P-set is a set desired pressure inputted into input source 15 and/or control unit 16, and represents the desired pressure with which the cavities should be filled. The set pressure is constant regardless whether a cavity is in contact with the feed channel 12 or not. P-set is the desired pressure in the feed channel, preferably relatively close to the outlet of the feed channel.

During production the control unit 16 compares actual pressure p-fc with desired pressure p-set. As soon as a cavity comes in communication with the feed channel, mass will flow into the cavity and pressure p-fc will drop below p-set. The control unit will respond and will send signal s-cp to the feed pump with the result that the pressure on the mass will be increased.

When p-fc exceeds p-set the pump will stop. Another input value at the input source 15 and/or control unit 16 is the speed of the pump sDP.

Further, depending on the controller and type of control loop that will be used, the P, I and/or D settings can be input parameters to determine the response as soon as a deviation from the set pressure p-set will occur. To ease operation of the forming apparatus the P, I and D settings can also be machine settings and will in that case be changed only occasionally.

The speed of the pump sDP and the P, I and D settings can be input parameters in all described pressure controlled systems in this document.

Figure 4:
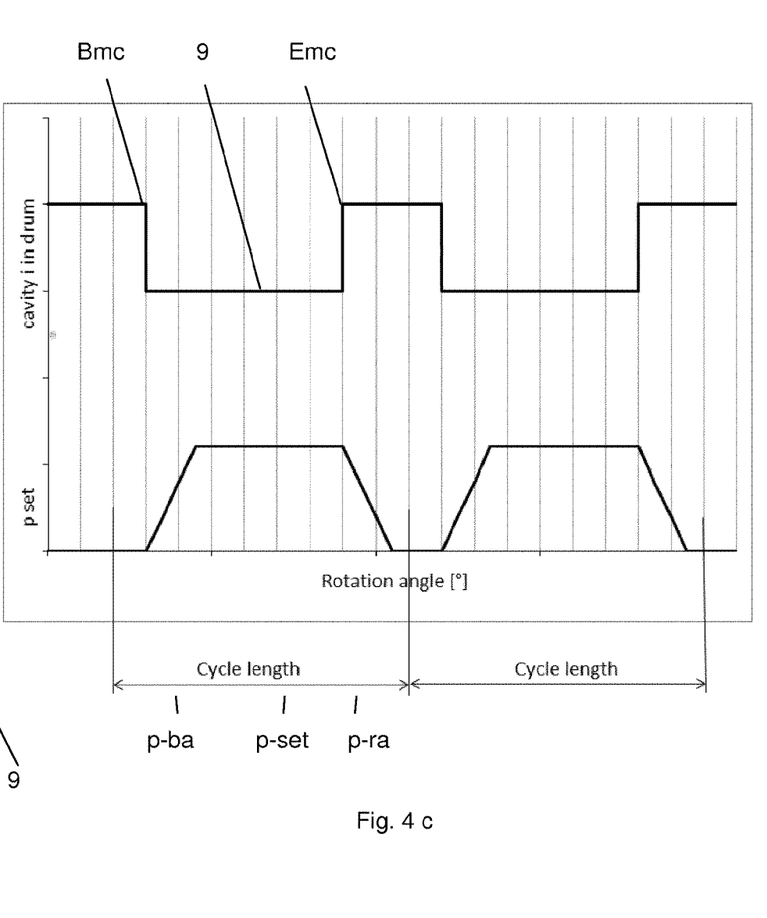
FIGS. 4a, 4b, and 4c show the inventive system and a potential control scheme of the inventive food mass forming system.
Figure 4A:
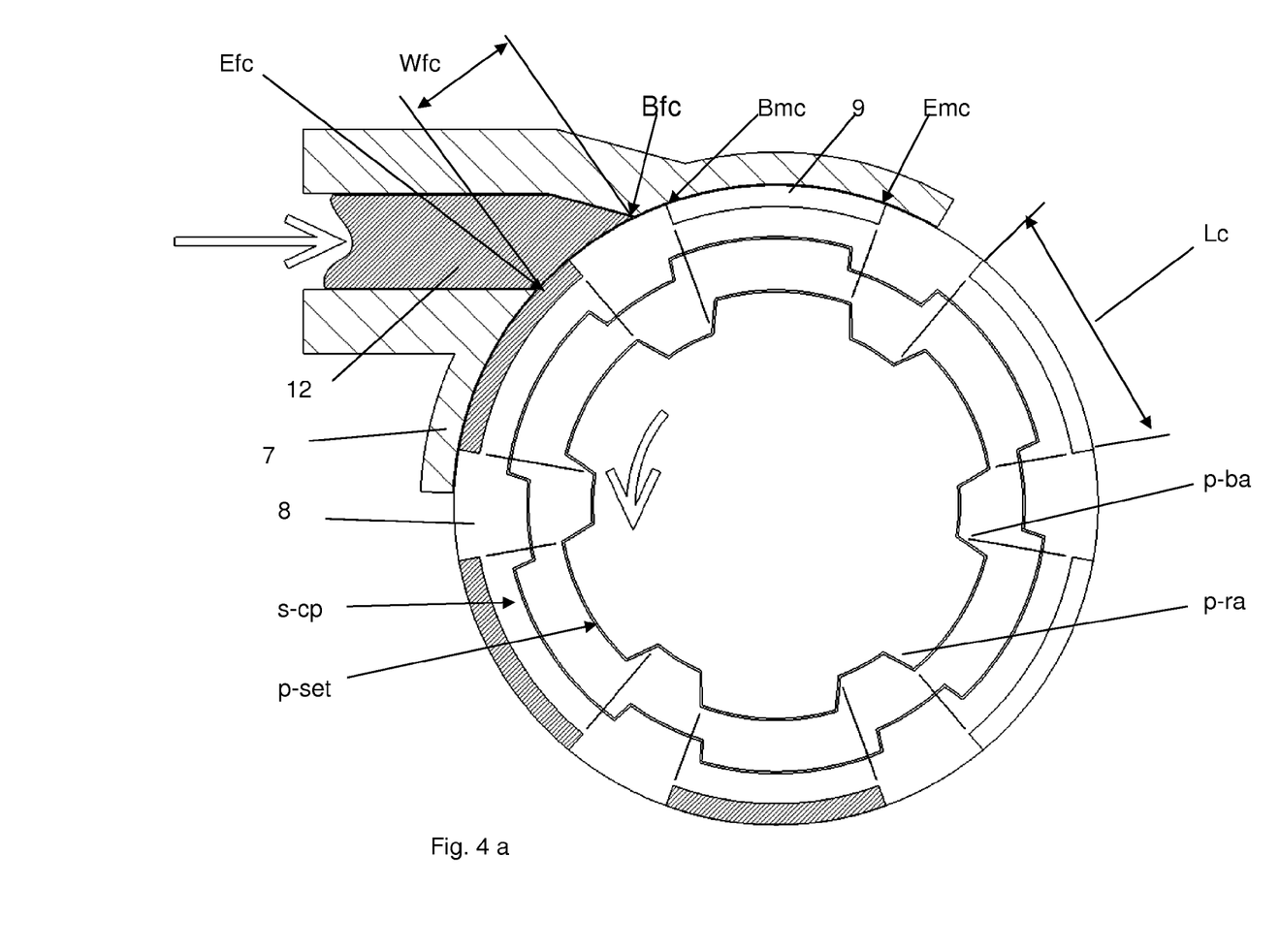

FIGS. 4a, 4b, and 4c show a more sophisticated pressure control system. Drum 8 in FIG. 4a is provided with 6 rows each with a multitude of mould cavities. Each cavity is characterized by Bmc (begin mould cavity), Emc (end mould cavity) and Lc (length of a mould cavity in circumferential direction of the drum). The feed channel 12 is characterized by Bfc (begin feed channel), Efc (end feed channel) and Wfc (width of the feed channel in circumferential direction drum). The width of the feed channel covers the entire length of the drum in axial direction.

The mould system comprises a sensor which is connected to a control unit so that the control unit knows the position of the cavities with respect to the position of the feed channel. Hence, every row of cavities will be filled the same way to prevent weight differences and shape distortion of formed products independent in which row of the drum the products are formed. Therefore detection means 13, with which the position of the cavities and/or the drum can be determined versus the position of the feed channel, are provided. Depending on the chosen detection means one or more (for example for every row) cavity and/or drum position means 14 will be used too.

The pressure in feed channel 12 will preferably be controlled to a value which is in accordance with the value of the desired pressure p-set which is at that moment projected with respect to Bfc. In the embodiment of FIG. 4a the pressure in feed channel 12 is zero bar as long as no filling takes place and will be increased as soon as Bmc (begin of cavity 9) passes Bfc (begin of feed channel). As a result of the pressure difference between feed channel 12 and empty cavity 9, mass will flow from the feed channel into the cavity. As soon as the end of the cavity Emc has passed the beginning of feed channel Bfc, the set pressure will be reduced to zero again. The same control scheme is executed for the next row of cavities.

FIG. 4b shows that control unit 16 receives a signal p-fc (actual pressure in the feed channel) and a signal s-pd (signal actual position cavities and/or drum). Further it receives the desired pressure profile p-set versus the rotational angle of the drum, see FIG. 4c. This pressure profile includes parameters p-ba (pressure build-up angle to determine the ramp-up of the pressure) and p-ra (pressure reduction angle to determine the ramp-down of the pressure) and is related to the dimension of cavity 9 to be filled. The cycle length is defined as the rotational angle of the drum which corresponds with one row of cavities.

Within the system all kind of delays can occur, see FIG. 4b; response time of the pressure measuring means 17, response time of the detection means 13, response time PLC/control unit 16, inertia of the volume of mass between pump and drum, compressibility of the used mass, inertia of response time pump, etc. Preferably control unit 16 will take these delays into account and will calculate signal s-cp based on the set pressure p-set versus rotation angle of the drum in combination with the expected delays to control the pump accordingly.

Depending on the used detection means 13 and drum position points 14, the control unit needs additional information such as the diameter of the drum, the number of rows in the drum, the circumferential position of the cavities in the drum and, depending on the embodiment, the length of a cavity Lc. The speed of rotation of the drum sMM can be calculated within the control unit based on signal s-pd or can be an input parameter. This applies to all further described embodiments in this document where detection means 13 are used.

The filling length, i.e the rotational angle of the drum during which filling shall take place is not an input parameter in the present control scheme, but is for example dependent on p-set, the viscosity of the food mass and/or the rotational speed of the drum. It is preferred to achieve a filling length which is equal or longer than the length of the respective mould cavity in circumferential direction of the drum.

The embodiments in the present application are not limited to the described filling profiles and/or systems.

Figure 5:
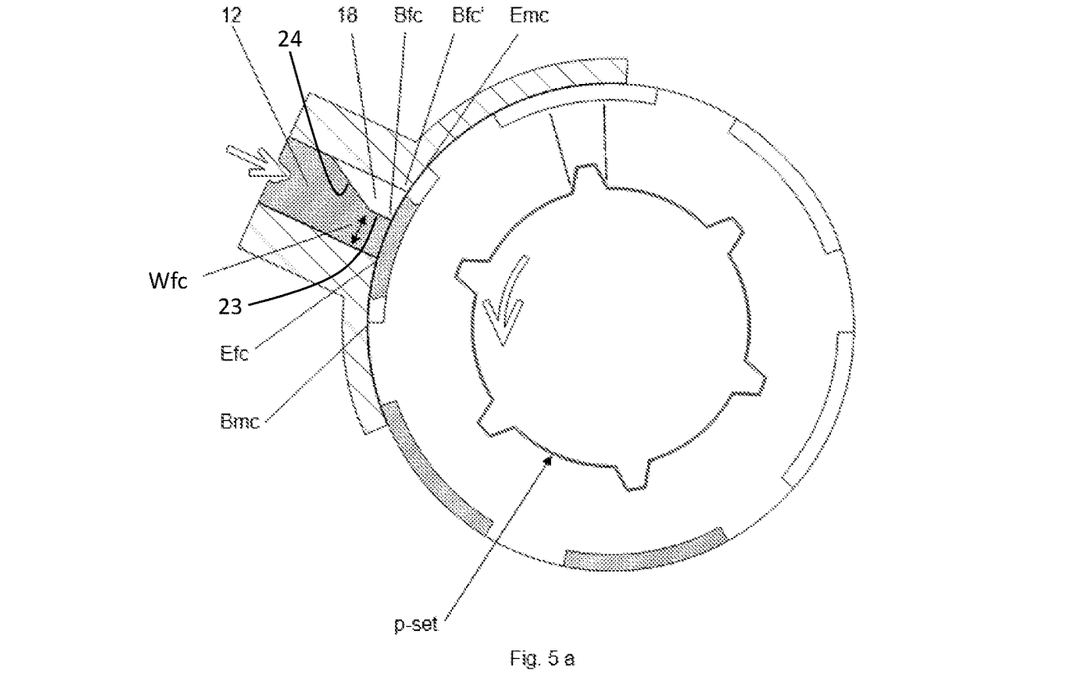
FIGS. 5a and 5b show the adaptation of the exit of the feed channel depending from the food mass.

FIG. 5a shows an embodiment of the invention to adapt the width Wfc of the exit of the feed channel to the food mass that shall be filled into the cavities, because it has been found, that the quality of the end product is dependent from the width Wfc of the feed channel. In case meat is used as the food mass, it is advantageous to use a relatively small width Wfc when meat with many fibers is formed, in comparison to forming a meat with little fibers. In this case a relatively large width Wfc can be used.

In the present case the adaptation of the width Wfc is carried out with a preferably removable insert 18 in feed channel 12, in this embodiment insert 18 is connected to edge Bfc'. However, it can also be connected to the opposite edge. The insert is preferably provided in the vicinity of the exit of the feed channel 12. More preferably, the insert is tapered in the direction opposite of the flow direction of the food mass.

The feed channel 12 is tapered or comprises an insert 18 that is tapered in a direction opposite a flow direction of the food mass through the feed channel 12. The feed channel 12 includes a sloped wall 24 that tapers in a direction opposite a flow direction of the food mass, and the feed channel 12 comprises a straight wall 23 downstream of the sloped wall 24.

The width Wfc of the exit of the feed channel is adapted to the individual food mass.

When forming burgers out of a fibrous mass in a forming apparatus with a basic pressure and/or basic volume control in combination with a relatively wide feed channel Wfc (for example 40 mm) and afterwards cook these burgers the shape tend to change due to shrinkage. In circumferential direction of the drum the cooked burger will be smaller as in length direction of the drum. This is due to the fiber orientation as result of the direction of the mass flow but also due to the displacement of mass in the cavity which will result in difference in density in circumferential direction of the drum.

Reference can be made to WO 2012059188 which describes a method to remain the product shape even after a heat treatment process. For example after cooking a round formed product such as a hamburger the meat patty will shrink uniformly in all directions and will remain its round shape. In this application use is made of a base member with a multitude of holes through which the food mass, particularly meat is pressed with the result that the cavity in the drum will be filled with multiple layers of mass strands.

The formed product will have a uniform density not only across its cross section but also across its entire surface area. Furthermore the formed product will be flat and thickness of the product will be essentially the same over the entire surface area.

Based on a relatively wide feed channel Wfc, improvements can be made to reduce the difference in shrinkage between the circumferential and length direction of a formed product after cooking without use of an additional accessory as in WO 2012059188. This can be achieved by decreasing the width Wfc at the outlet of the feed channel from about 40 mm back to a much smaller value, for example 15 mm. The mass is forced through the small outlet of the feed channel and based on the same speed and pressure of the feed pump as without insert 18, the speed of the mass through the small outlet will be increased and the mass will enter the empty cavity with more momentum which will result in an improved fiber orientation. To achieve a more or less symmetrical filling in circumferential direction of the drum, filling of the cavity should preferably take place in case the cavity in the drum is positioned versus the feed channel as shown in FIG. 5a.

In the filling profile (desired pressure p-set versus rotation angle of the drum) in FIG. 5a the pressure on the mass will preferably be released relatively fast. This can, for example, be achieved by changing the rotation direction of the rotor of the pump (when using a vane pump) to give the mass in the feed channel the opportunity to relax.

This relaxation of mass is not advantageous in case, for example, due to the internal binding of the mass, backflow of the food mass into the feed channel has to be expected. In this case, the pressure should be maintained till the end of the cavity Emc passed the end of feed channel Efc.

FIG. 5b shows another advantage of a small feed channel Wfc. The filling of cavities in row I will not be influenced by the filling of the cavities in row II even if the cavities are positioned in a short distance from each in circumferential direction of the drum.

A smaller feed channel is also advantageous regarding the cutting of fibers.

With a relatively large Wfc, the larger the binding in the mass the larger risk that the cavities will not be filled completely. When processing a fibrous mass, due to the large outflow area of the feed channel, a strong binding occur between the mass deposited in the cavity and the food mass still present in the feed channel. Result will be that this binding force will tend to pull the food mass out of the cavity. A smaller outflow area of the feed channel will result in reduced binding forces.

Beside a smaller outflow area of the feed channel the backflow of food mass can also be reduced by maintaining and/or increasing the pressure on the food mass as long as the cavity is in communication with the feed channel even after the cavity is already entirely filled.

When processing fibrous food mass it is extremely important that a well functioning cutting edge, preferably part of a separate cutting member, will be used which will eliminate the strong binding as soon as the filled cavity is passing Efc. In FIG. 5a the cutting edge will be positioned at Efc, the end of feed channel 12. A cutting edge will work most efficient in combination with a small feed channel.

In FIGS. 6a, 6b, 6c, 6d, 6e, 6f, 6g, and 6h, another embodiment of the invention is shown which is even more advantageous for forming round burgers which shape will be remain even after cooking.

Figure 6:
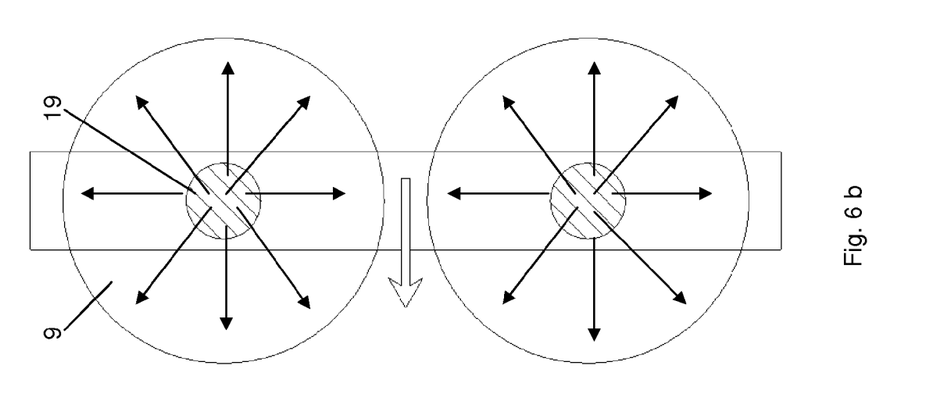
FIGS. 6a, 6b, 6c, 6d, 6e, 6f, 6g, and 6h show one individual exit of food mass per cavity in one row.

In FIG. 6a the cavity in the drum will be filled via the relatively small recess 19 for example in the insert 18 or directly in the feed channel. The food mass exits the feed channel through the recess 19. There is one recess per cavity in one row provided. Each recess forms a strand of food mass, which flows into the mould cavity. This relatively small recess is at least similarly shaped as the shape of the resulting product, but the size is more preferably different. In the present case a round patty shall be formed. Consequently, the recess is round shaped as well similar to the shape of the cavity in the drum. Preferably, in the instant that the mass is pressed through the relatively small round recess 19 and from thereon into the cavity in the drum, the center of the cavity in circumferential direction of the drum is positioned in line with recess 19 as shown in FIG. 6b. Consequently, the mass will flow, after entering the cavity, preferably at least essentially symmetrically, towards the sidewall of the cavity as shown by the arrows. Thus, the fibers within the fibrous mass will also be oriented in the direction shown by the arrows.

When cooking such a formed product the formed product will shrink uniformly in the direction in which the fibers are orientated with result that after cooking the round shape will be remain.

This invention is not limited to a round shaped product. In case the cavity in the drum is provided with another customized shape, recess 19 in insert 18 will preferably be shaped the same.

In the embodiment according to FIGS. 6c and 6d the mass is first flowing through the relatively small round recess 19 in insert 18 and from thereon it will be distribute in a larger recess 20 in seal plate 7 and/or in a manifold 21. Preferably this recess will have the same shape as the shape of the cavity in the drum, in this embodiment a round shape. To obtain a symmetrical filling in combination with a high drum speed it can be, due to the short available filling time, advantageous that recess 20 is equal in dimension with the cavity in the drum and/or is even somewhat larger. Due to the presence of mass in recess 20 a shorter filling time will be needed compare to the embodiment of FIGS. 6a and 6b.

To obtain a symmetrical filling in cavities in succeeding rows it is preferable that the pressure on the mass will be released relatively fast after filling a row of cavities. This can be achieved by changing the rotation direction of the rotor of the pump (when using a vane pump) to give the mass in the feed channel the opportunity to relax. This relaxation of mass is not advantageous in case, due to the internal binding of the mass, backflow has to be avoided. In this case, the pressure should be maintained till the end of the cavity Emc passed the end of feed channel Efc.

In general the process of creating a round fibrous burger with a drum is more advantageous than with a forming apparatus with a reciprocating plate. When a cavity in a moving form plate is filled with mass and it makes its outward movement to the knock out position both the top side of the formed product as the bottom side will be in moving contact with counter plates to keep the formed product within the cavity. This sliding contact will result in orientation of fibers at both the top surface as bottom surface of the formed product in direction of movement which is also negative with respect to remaining the shape after cooking.

When using a mould drum only the topside of the formed product will be in moving contact with a counterpart, namely with the seal plate. When using only closing means and no holding means which is shown in WO 2013107815 the duration of this contact is as short as possible which is also advantageous regarding the remaining of the fiber orientation.

For all the embodiments of FIG. 6a-6d, the lower the speed of the drum during filling the more the shape will remain after a heat treatment process such as cooking. A further improvement can be made by further optimizing the shape of the recess in the insert and/or manifold and/or seal plate in that way that the mass will flow in the cavity such that the fiber orientation will be symmetrical.

Reduction of the drum speed or even stop the rotation of the drum during the filling of the cavities is another alternative.

FIG. 6e shows an embodiment wherein a dispensing piston 22 is enclosed in manifold 21 which piston can make a reciprocating movement between an extended position and a retracted position (i.e., FIG. 6g) to allow mass to displace in a mould cavity. The dispensing piston 22 is located farther from the mold cavities when the dispending piston 22 is in the retracted position than when the dispending piston 22 is in the extended position. In FIG. 6f, the drum is rotating counter clockwise and there is a small gap between the lower surface of the piston and the outer surface of the drum. In FIG. 6g, the piston is in a retracting position to allow mass, which is under pressure in the feed channel, to flow along the piston and through recess 19 into the cavity in the drum. FIG. 6h shows the piston in an extended or seal position, where it will prevent that the mass in the filled cavity will relax and/or that backflow will occur. The piston will maintain in this position until the cavity in a next row has to be filled. As discussed below with reference to the third embodiment, the dispending piston 22 acts as a valve to open and close the connection between the feed channel and the cavities.

In a first embodiment of displacing the mass into cavity 9 of the drum the mass in the feed channel is subjected to pressure p-set and the amount of mass to be displaced will be determined by the stroke length the piston will make during the retracting movement.

In a second more controlled embodiment the mass in the feed channel is also subjected to pressure p-set but to displace the correct volume of mass from the feed channel into the cavity in the drum the force on dispensing piston 22 can be related to the actual pressure in the feed channel to prevent that the pressure exerted by the dispensing piston on the mass is different than the pressure exerted by the pump on the mass.

In a third more preferred embodiment the displacement of mass in the feed channel will be volume controlled by pump 4. The dispensing piston acts as a valve to open and close the connection between feed channel and cavity in the drum and the amount of volume displaced by the pump will also pass piston 22 and flow into a cavity in the drum. Reference can be made to WO 2012/2059188 which discloses a device and/or a system to maintain the product shape after a heat treatment process and wherein a cutting member is used which also acts as a valve.

This embodiment of symmetrical filling is not limited to the described filling profiles and/or the discussed control systems.

LIST OF REFERENCE SIGNS 1 food product forming apparatus
2 mass supply system
3 hopper
4 feed pump/pump system
5 mass transport means
6 divider
7 seal, seal plate
8 mould member, Mould drum, Mould plate
9 mould cavity
10 rib
11 porous structure
12 feed channel
13 detection means position cavities and/or drum e.g. sensor, encoder
14 cavity and/or drum position point, for example a cam
15 parameter input source e.g. operating panel
16 control unit
17 pressure measuring means e.g. sensor
18 insert/removable insert
19 exit, recess in insert 18
20 recess in seal plate 7 and/or in manifold 21
21 manifold
22 dispensing piston
23 straight wall
24 sloped wall
Bmc begin mould cavity seen in rotational direction drum
Emc end mould cavity seen in rotational direction drum
Bfc begin feed channel
Efc end feed channel, cutting edge
Lc length mould cavity in circumferential direction of the drum
p-fc actual pressure of the food mass in the feed channel
p-set desired set pressure
p-ba pressure build-up angle
p-ra pressure reduction anglef
s-cp signal movement of the feed pump from the control unit to the pump or vice versa
Wfc width outlet feed channel in circumferential direction drum

The invention claimed is:

1. A system for forming a food product from a food mass, comprising:
    a mould member that is a drum that includes a multitude of cavities, the food product is formed in each of the cavities;
    a feed channel that feeds the food mass into the cavities,
    a seal plate located downstream of the feed channel, which seals the cavities against leakage during and/or after filling, and
    a valve provided in the seal plate, the valve includes a piston that reciprocates between a retracted position and an extended position to open and close a connection between the feed channel and the cavities in the mould member, respectively, wherein the piston is located farther from the cavities when the piston is in the retracted position than when the piston is in the extended position, and wherein when the piston is in the retracted position, pressurized food mass flows along the piston and into the cavities, wherein the feed channel is tapered or comprises an insert that is tapered in a direction opposite a flow direction of the food mass through the feed channel, wherein the feed channel includes a sloped wall that tapers in a direction opposite a flow direction of the food mass, and wherein the feed channel comprises a straight wall downstream of the sloped wall.

2. The system according to claim 1, wherein the valve seals of a chamber of the feed channel.

3. The system according to claim 1, wherein the piston is provided in the feed channel.

4. The system according to claim 3, wherein the piston compresses the food mass in the feed channel.

5. The system according to claim 1, wherein in the retracted position, a gap is defined between a tip of the piston and a surface of the mould member.

6. The system according to claim 1, wherein the multitude of cavities are provided in one row of the mould member, which are filled simultaneously, and wherein the feed channel, the seal plate, and/or the manifold comprises one individual exit per cavity in the one row.

7. The system according to claim 6, wherein the feed channel extends over essentially an entire length of the mould member.

8. The system according to claim 1, wherein the piston is arranged in a manifold, the piston is configured to make a reciprocating movement into an exit in the seal plate to allow the food mass to flow into one of the respective cavities.

9. The system according to claim 8, wherein the system comprises a multitude of dispensing pistons that correspond to each of the multitude of cavities that are arranged in a row along a longitudinal axis of the mould member, the multitude of dispensing pistons are arranged generally parallel to one another.

10. The system according to claim 1, wherein a width of the feed channel in a region of the insert that is tapered is greater than a width of the feed channel in a region having a straight section.

11. The system according to claim 10, wherein in the extended position, the piston is in contact with the straight section.

12. The system according to claim 10, in the retracted position, the piston is free of contact with the straight section.

13. The system according to claim 12, wherein in the extended position, the piston is in contact with the straight section.

14. A system for forming a food product from a food mass, comprising:

a mould drum with a multitude of cavities, the food product is formed in each of the cavities;

a feed channel that feeds the food mass into the cavities, a seal plate located downstream of the feed channel, which seals the cavities against leakage during and/or after filling, and a multitude of dispensing pistons enclosed in a manifold and corresponding to a respective one of the cavities, and each of the dispensing pistons are configured to make a reciprocating movement into individual exits in the seal plate from an extended position to a retracted position where the dispensing pistons are moved away from the mould drum to allow the food mass to flow into each of the respective cavities, and wherein in the retracted position, pressurized food mass flows along the dispensing pistons and into the cavities, and in the extended position the dispensing pistons prevent the food mass from flowing into each of the respective cavities, wherein the feed channel is tapered or comprises an insert that is tapered in a direction opposite a flow direction of the food mass through the feed channel, wherein the feed channel includes a sloped wall that tapers in a direction opposite a flow direction of the food mass, and wherein the feed channel comprises a straight wall downstream of the sloped wall.

15. The system according to claim 14, wherein each of the dispensing pistons correspond to each of the multitude of cavities that are arranged in a row along a longitudinal axis of the mould member.

16. The system according to claim 14, wherein the dispensing pistons are in contact with the straight section when the dispensing pistons are in the extended position.

17. The system according to claim 16, wherein the dispensing pistons are free from contacting the straight section when the dispensing pistons are in the retracted position.

18. The system according to claim 17, wherein the dispensing pistons are free from contacting the sloped wall when the dispensing piston is in the retracted position.

* * * * *

UNITED STATES PATENT AND TRADEMARK OFFICE
CERTIFICATE OF CORRECTION

| | | |
|---|---|---|
| PATENT NO. | : 11,412,746 B2 | |
| APPLICATION NO. | : 16/710633 | |
| DATED | : August 16, 2022 | |
| INVENTOR(S) | : Hendrikus Petrus Gerardus Van Gerwen | |

It is certified that error appears in the above-identified patent and that said Letters Patent is hereby corrected as shown below:

On the Title Page

Item (30) Foreign Application Priority Data:
Delete "13195750" and insert --13195750.8--

Signed and Sealed this
Tenth Day of January, 2023

Katherine Kelly Vidal
*Director of the United States Patent and Trademark Office*